Nov. 4, 1969  R. E. SCHROEDER  3,476,904

CONVEYOR ROLLER MEMBER ASSEMBLY

Filed Feb. 8, 1968

INVENTOR.
Royal E. Schroeder
BY
Richard G. Stahl
ATTORNEY

United States Patent Office 3,476,904
Patented Nov. 4, 1969

3,476,904
CONVEYOR ROLLER MEMBER ASSEMBLY
Royal E. Schroeder, Royal Oak, Mich., assignor to General Motors Corporation, Detroit, Mich., a corporation of Delaware
Filed Feb. 8, 1968, Ser. No. 703,963
Int. Cl. H05b 9/06
U.S. Cl. 219—10.55     3 Claims

ABSTRACT OF THE DISCLOSURE

A conveyor roller member assembly which may be installed within a microwave heating energy environment wherein a metal cylinder roller member, selected to have a cut-off wave length of a value shorter than the wave length of the dominant mode of energy of the microwave heating energy, is revolvably supported upon a support rod member within a microwave heating energy environment by metal bearings positioned within and adjacent to each end of the cylinder member and located at respective points of minimum microwave heating energy field strength.

---

This invention relates to conveyor roller member assemblies for roller conveyors and, more specifically, to conveyor roller member assemblies for roller conveyors which may be installed within a microwave heating energy environment.

Materials are generally transported on a continuous basis through microwave heating environments in a heating cavity by the use of looped belt conveyors. However, looped belt conveyor systems require that provision be made to prevent external radiation of microwave energy from the open ends of the heating cavity. With moderate or low microwave energy, the use of large entrance and exit vestibules with suitable water loads on respective ends of the heating cavity has been effective in reducing external microwave energy radiation. With high microwave energy, however, looped belt conveyors are impractical because the required entrance and exit vestibules become excessively long. A more practical approach for preventing external radiation of high microwave energy from microwave heating cavities has been the use of positive sealing doors on respective ends of the heating cavity and roller conveyors for transporting articles through the cavity as the positive sealing doors preclude the use of looped belt conveyors. Conveyor roller assemblies which have been constructed of ceramic, plastic or other low loss materials for high microwave energy applications have proved to be unsatisfactory because of the poor rolling characteristics, as a result of high friction on the bearing supports, and high susceptibility to abrasion and/or wear. Furthermore, warping is experienced when polymeric roller materials are used. Metal conveyor rollers, while being more durable than either ceramic or plastic rollers, have heretofore been unsatisfactory for use in microwave heating energy environments because of the arcing produced by the build-up of electrical charges on isolated, ungrounded, or discontinuous metal surfaces.

It is, therefore, an object of this invention to provide an improved conveyor roller member assembly.

It is another object of this invention to provide an improved conveyor roller member assembly employing metal rollers.

It is a further object of this invention to provide an improved conveyor roller member assembly employing metal rollers which may be installed within a microwave heating energy environment.

In accordance with this invention, a conveyor roller member assembly suitable for installation within a microwave heating energy environment is provided wherein a metal cylinder roller member having a cut-off wave length of a value shorter than the wave length of the dominant mode of energy of the microwave heating energy is revolvably supported by a support rod member and metal bearings.

Figure 1:
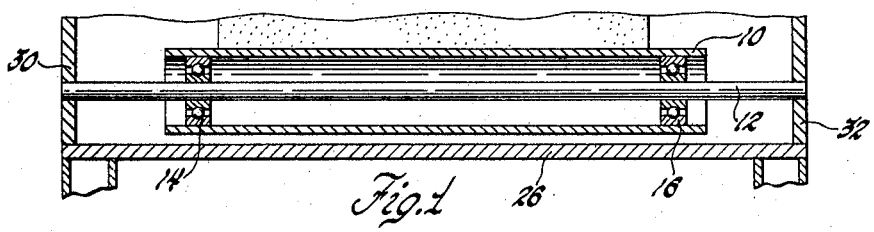

For a better understanding of the present invention, together with additional objects, advantages and features thereof, reference is made to the following description and accompanying drawings in which FIGURE 1 is a longitudinal cross section view of the conveyor roller member assembly of this invention.

Figure 2:
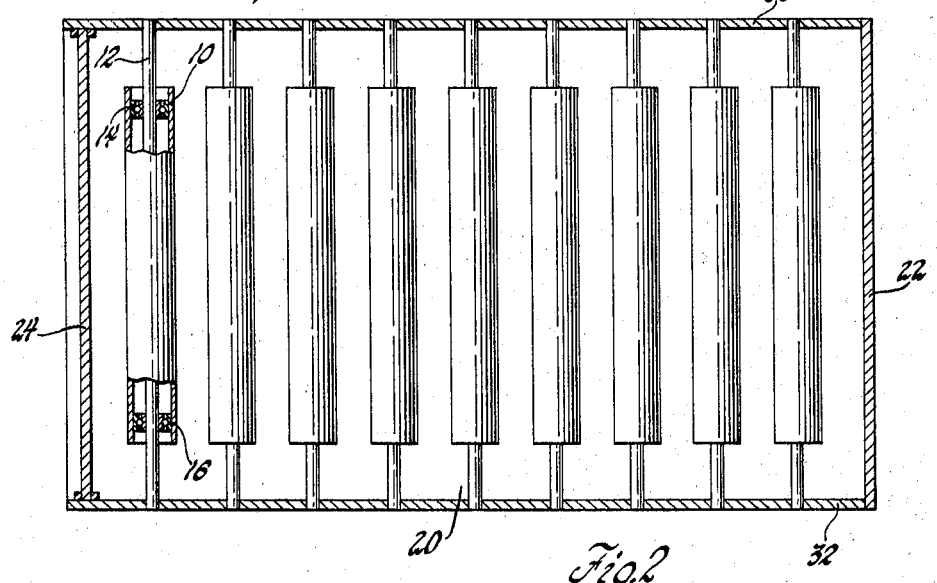
Figure 3:
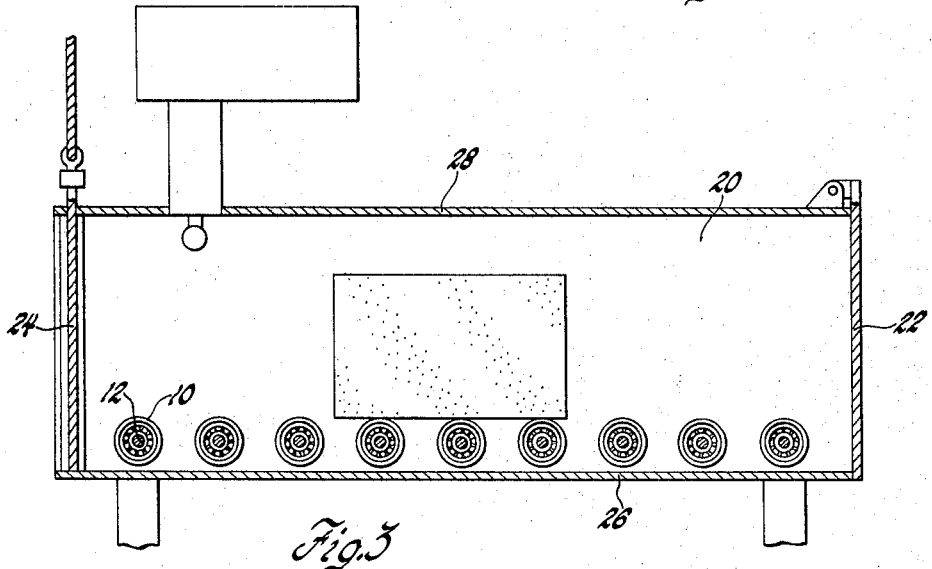

FIGURE 2 is a top view, partially in section, of a series of conveyor roller member assemblies of this invention installed in spaced relationship with the longitudinal axes parallel to provide a roller conveyor through a heating cavity which may be permeated with microwave energy, and, FIGURE 3 is a side view, in section, of FIGURE 2.

In FIGURE 1 of the drawings, the conveyor roller member assembly of this invention is shown to include a cylinder roller member 10 of any suitable metal such as aluminum or steel, a support rod member 12 and metal bearings 14 and 16.

To prevent or reduce the propagation of microwave heating energy waves through cylinder roller member 10, actually a wave guide of circular cross section, which will produce undesirable heating of metal surfaces therewithin, cylinder roller member 10 must have a cut-off wave length of a value shorter than the wave length of the dominant mode of energy of the microwave heating energy in the environment in which it will be installed. Therefore, the inside diameter of cylinder roller member 10 is selected to be of a value which will insure that the cut-off frequency thereof is greater than the frequency of this microwave heating energy. In other words, the diameter of cylinder roller member 10 is selected to be small enough to prevent the passage of this microwave heating energy therethrough by the usual wave propagation modes. As the dominant mode of energy for a circular wave guide is the $TE_{1,1}$ mode, the diameter of a cylinder roller member 10 must be smaller than the diameter of a cylinder which will propagate the $TE_{1,1}$ mode of energy of the frequency of the heating energy.

Support rod member 12 extends axially through and beyond the ends of cylinder roller member 10. With light duty applications, support rod member 12 may be of a low loss material such as polypropylene, silicone, polyethylene, polyphenylene oxide or tetrafluoroethylene. It is to be understood that this listing is representative but not exhaustive of the low loss materials which may be employed. Other more severe applications may require support rod member 12 to be of metal.

Bearing members 14 and 16 are positioned within and adjacent to each respective end of cylinder roller member 10. These bearing members are in operative engagement with cylinder roller member 10 and support rod member 12 whereby cylinder roller member 10 may be revolved about support rod member 12. Although bearing members 14 and 16 are illustrated in the figures to be ball bearings, it is to be specifically understood that these bearings may also be of the roller, sleeve or any other suitable type which will permit cylinder roller member 10 to be revolved about support rod member 12.

With support rod member 12 of a low loss material and, of course, the diameter of cylinder roller member 10 properly selected, the precise location of bearing members 14 and 16 within cylinder roller member 10 is not particularly critical as cylinder roller member 10 of a properly selected diameter prevents the propagation of the microwave heating energy therethrough. Consequently, microwave heating of the metal bearings is not a problem.

With support rod member 12 of a metal material, some of the modes of the microwave heating energy will be propagated along support rod member 12 into cylinder roller member 10. Therefore, bearing members 14 and 16 must be located at respective points of minimum microwave heating energy field strength to prevent these members from being intolerably heated by the microwave heating energy.

To locate bearing members 14 and 16 at the respective points of minimum microwave energy field strength in a practical application, a small neon tube was passed along metal support rod member 12 through cylinder roller member 10. The points at which the neon tube was not illuminated accurately indicated the points of minimum microwave heating energy field strength. Bearing members 14 and 16 were located at the points of minimum microwave heating energy field strength which were adjacent the respective ends of cylinder roller member 10.

A typical installation of a series of conveyor roller member assemblies of this invention to provide a roller conveyor in a microwave heating energy cavity 20, defined by end doors 22 and 24, bottom 26, top 28, and two side members, not referenced, is shown in FIGURES 2 and 3. The several conveyor roller member assemblies are placed in a spaced relationship with the longitudinal axes parallel and supported by side rail members 30 and 32 which engage the free ends of support rod members 12. Rail members 30 and 32 may be of either a metal or low loss material, as determined by the severity of the application.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A conveyor roller member assembly which may be installed within a microwave heating energy environment comprising, a metal cylinder roller member having a cut-off wave length of a value shorter than the wave length of the dominant mode of energy of the microwave heating energy, a support rod member extending axially through and beyond the ends of said cylinder roller member and metal bearing means in operative engagement with said cylinder roller member and said support rod member positioned within and adjacent to each end of said cylinder roller member whereby said cylinder roller member may be revolved about said support rod member.

2. A conveyor roller member assembly which may be installed within a microwave heating energy environment comprising, a metal cylinder roller member having a cut-off wave length of a value shorter than the wave length of the dominant mode of energy of the microwave heating energy, a support rod member of low loss material extending axially through and beyond the ends of said cylinder roller member and metal bearing means in operative engagement with said cylinder roller member and said support rod member positioned within and adjacent to each end of said cylinder roller member whereby said cylinder roller member may be revolved about said support rod member.

3. A conveyor roller member assembly which may be installed within a microwave heating energy environment comprising, a metal cylinder roller member having a cut-off wave length of a value shorter than the wave length of the dominant mode of energy of the microwave heating energy, a metal support rod member extending axially through and beyond the ends of said cylinder roller member and metal bearing means in operative engagement with said cylinder roller member and said support rod member positioned within and adjacent to each end of said cylinder roller member and located at respective points of minimum microwave heating energy field strength whereby said cylinder roller member may be revolved about said support rod member.

References Cited

UNITED STATES PATENTS

| 2,483,933 | 10/1949 | Revercomb et al. | 219—10.55 |
| 2,500,752 | 3/1950 | Hanson et al. | 219—10.55 |

FOREIGN PATENTS

| 491,112 | 3/1953 | Canada. |

JOSEPH V. TRUHE, Primary Examiner

L. H. BENDER, Assistant Examiner

U.S. Cl. X.R.

219—10.69